United States Patent
Ishida

(10) Patent No.: US 8,743,296 B2
(45) Date of Patent: Jun. 3, 2014

(54) ON-VEHICLE DISPLAY APPARATUS

(75) Inventor: Yoshimitsu Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 12/972,532

(22) Filed: Dec. 20, 2010

(65) Prior Publication Data

US 2011/0170023 A1 Jul. 14, 2011

(30) Foreign Application Priority Data

Jan. 13, 2010 (JP) ................................ 2010-005050

(51) Int. Cl.
*H04N 5/64* (2006.01)

(52) U.S. Cl.
USPC ............... 348/837; 345/7; 359/632; 359/630

(58) Field of Classification Search
USPC ....................................................... 348/837
See application file for complete search history.

(56) References Cited

U.S. PATENT DOCUMENTS

2007/0115205 A1* 5/2007 Uchiyama ..................... 345/7
2008/0212196 A1* 9/2008 Watanabe et al. ............ 359/632

FOREIGN PATENT DOCUMENTS

JP 2001-097073 4/2001
JP 2006-143125 6/2006

* cited by examiner

*Primary Examiner* — Anner Holder
(74) *Attorney, Agent, or Firm* — Ditthavong Mori & Steiner, P.C.

(57) ABSTRACT

An on-vehicle display apparatus includes a display, a reflector, a rotation device, a manual operation device, an automatic operation device, a controller, and a memory. The manual operation device is capable of, during manual operation thereof, causing the rotation device to operate the reflector in a first rotation direction and a second rotation direction. The memory stores, in association with a rotation position stored in the memory, a rotation direction of the reflector rotated to the rotation position based on an input from the manual operation device. When the controller causes, based on an input from the automatic operation device, the rotation device to rotate the reflector and to stop the reflector at the rotation position stored in the memory, the controller causes the rotation device to rotate the reflector in the rotation direction stored in the memory in association with the rotation position.

5 Claims, 3 Drawing Sheets

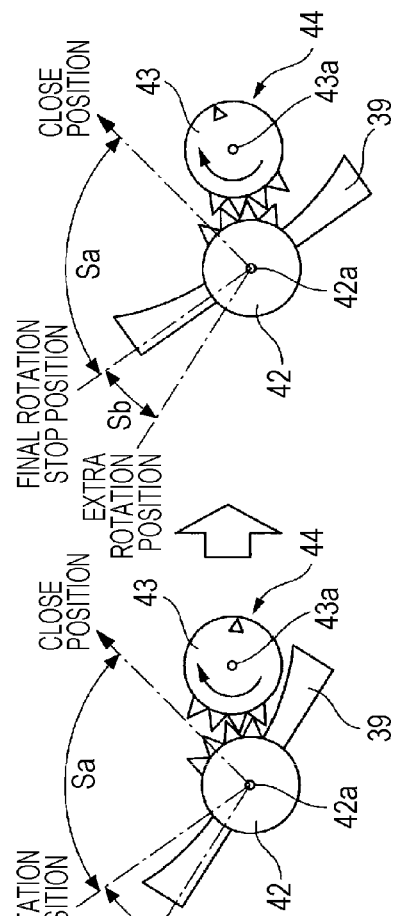
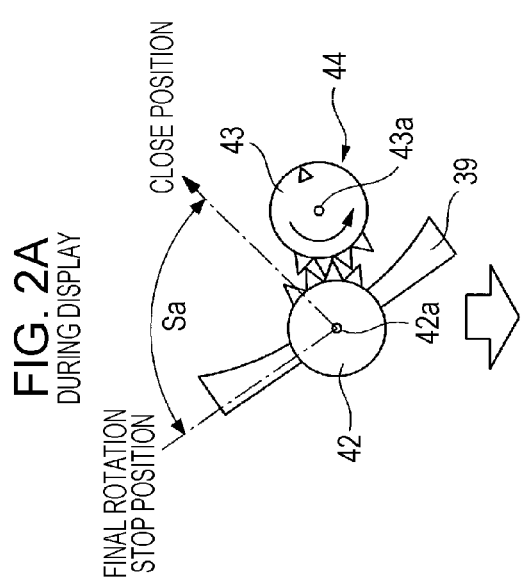
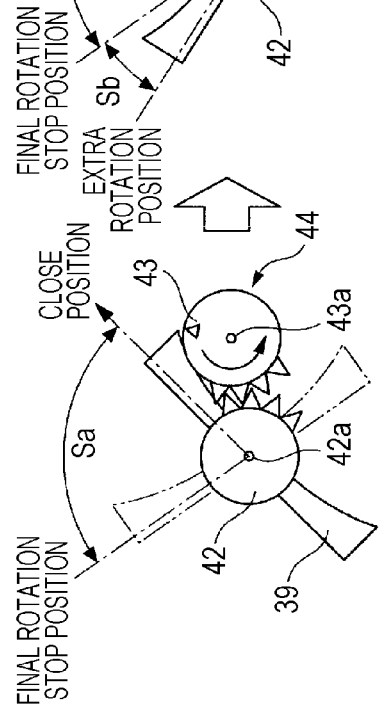

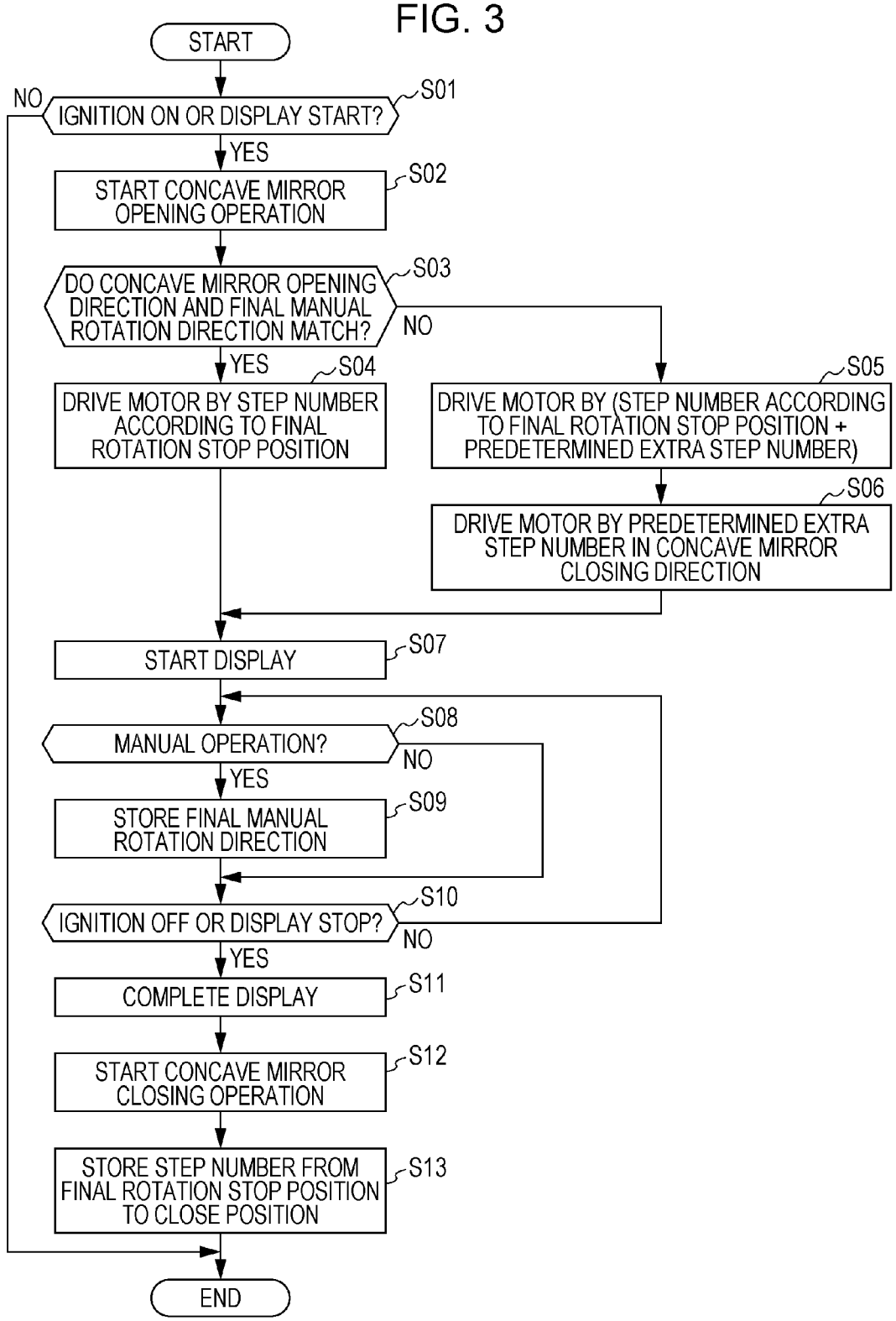

ON-VEHICLE DISPLAY APPARATUS

CROSS-REFERENCE TO RELATED APPLICATIONS

The present application claims priority under 35 U.S.C. §119 to Japanese Patent Application No. 2010-005050, filed on Jan. 13, 2010, entitled "On-vehicle Display Apparatus". The contents of this application are incorporated herein by reference in their entirety.

BACKGROUND OF THE INVENTION

1. Field of the Invention

The present invention relates to an on-vehicle display apparatus.

2. Description of the Related Art

In the past, the angle of an optical system (e.g., a concave mirror and a display screen) has been adjustable in a display device, such as a head-up display for a vehicle, for example, such that a display image can be projected on the position according to the position or posture of a driver. A mechanism for the adjustment includes mechanical movable parts, such as gears, and thus may have backlash between gears. For example, in a display device in which automatic change in position of an optical system, such as automatic opening and closing of a display screen, is performed in accordance with ON and OFF of the ignition of a vehicle, the position of the optical system may deviate from a predetermined adjustment position owing to the backlash. Further, the occurrence of such positional deviation causes issues of uncomfortable feeling experienced by the driver and a reduction in convenience. To address such issues, an on-vehicle display apparatus has been known in the past which, in order to reduce a clearance between mechanical movable parts, such as a backlash attributed to a gap between a reflecting mirror and a positioning unit or a rotational movement adjustment device, for example, includes a spring member for biasing the reflecting mirror in one direction (see Japanese Unexamined Patent Application Publication Nos. 2006-143125 and 2001-97073, for example).

Meanwhile, the on-vehicle display apparatus according to the above-described related art requires a special mechanism for reducing the clearance between mechanical movable parts (e.g., a spring member for biasing a reflecting mirror in one direction). Therefore, there arise issues of an increase in the costs required for the configuration of the device and a reduction in the suitability for being mounted on a vehicle and the degree of design layout freedom.

SUMMARY OF THE INVENTION

According to one aspect of the present invention, an on-vehicle display apparatus includes a display, a reflector, a rotation device, a manual operation device, an automatic operation device, a controller, and a memory. The display displays an image. The reflector is rotatably supported and capable of reflecting the image displayed in the display toward a driver seating on a driver's seat in a vehicle. The rotation device rotates the reflector in a first rotation direction and a second rotation direction opposite to the first rotation direction. The manual operation device is capable of manually operating the rotation device. The automatic operation device is capable of automatically operating the rotation device. The controller is configured to control the rotation device based on an input from the manual operation device or the automatic operation device. The memory stores a rotation position of the reflector. The manual operation device is capable of, during manual operation thereof, causing the rotation device to operate the reflector in the first rotation direction and the second rotation direction. The memory stores, in association with the rotation position stored in the memory, a rotation direction of the reflector rotated to the rotation position based on the input from the manual operation device. When the controller causes, based on an input from the automatic operation device, the rotation device to rotate the reflector and to stop the reflector at the rotation position stored in the memory, the controller causes the rotation device to rotate the reflector in the rotation direction stored in the memory in association with the rotation position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A to 2D are diagrams illustrating an example of opening and closing operations of a concave mirror in the on-vehicle display apparatus according to an embodiment of the present invention; and FIG. 3 is a flowchart illustrating an operation of the on-vehicle display apparatus according to an embodiment of the present invention.

DESCRIPTION OF THE EMBODIMENTS

Figure 1:
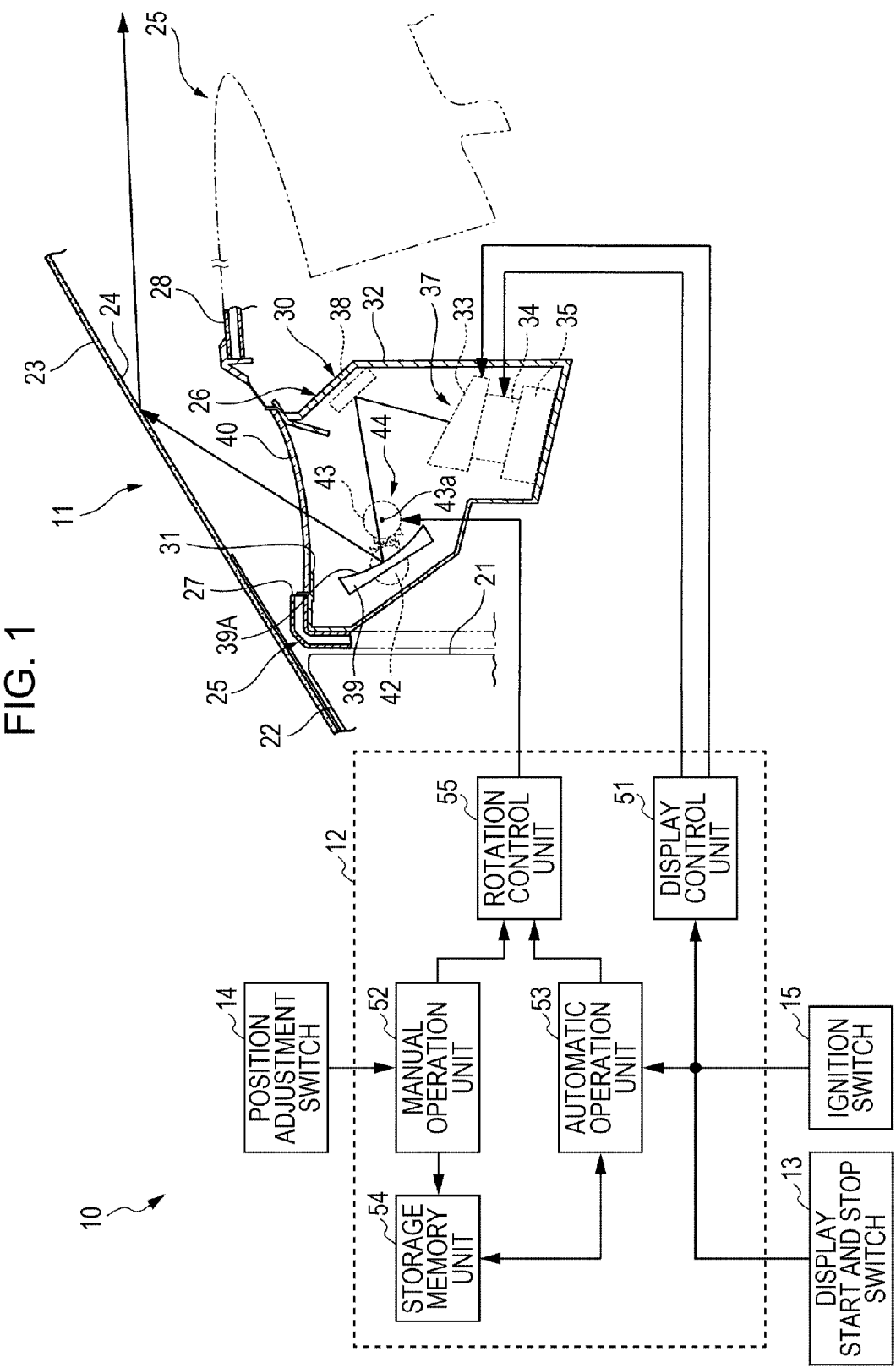
FIG. 1 is a configuration diagram of an on-vehicle display apparatus according to an embodiment of the present invention.

An on-vehicle display apparatus according to an embodiment of the present invention will be described below with reference to the accompanying drawings, wherein like reference numerals designate corresponding or identical elements throughout the various drawings. As illustrated in FIG. 1, for example, an on-vehicle display apparatus 10 according to the present embodiment is configured to include a head-up display device 11 and a control device 12. The control device 12 is connected to a display start and stop switch 13, a position adjustment switch 14, and an ignition switch 15, which are operated by an operator.

The on-vehicle display apparatus 10 is provided in, for example, a front part of the vehicle interior in front of a driver's seat in a vehicle. The front part of the vehicle interior includes a dashboard upper portion 21 formed to rise from a floor panel front portion of the vehicle (illustration thereof is omitted) and extending in the vehicle width direction. The dashboard upper portion 21 is provided with a cowl top 22 extending on an upper edge thereof in the vehicle width direction. Further, an opening in the front part of the vehicle interior (illustration thereof is omitted) is attached with a windshield 23 in an inclined state rising from a position near the cowl top 22 toward a rear part of the vehicle interior. A predetermined area in a vehicle interior-side surface of the windshield 23 forms a display portion 24. The display portion 24 displays the light of an image emitted from a later-described projection device 30 and reflected thereon as a display image.

The vehicle interior side of the dashboard upper portion 21 is attached with an instrument panel 25 extending in the vehicle width direction. The instrument panel 25 is attached with on-vehicle equipment such as a navigation device (illustration thereof is omitted) and measuring instruments such as a speedometer (illustration thereof is omitted). Further, the instrument panel 25 is provided with a storage unit 26 formed in the vicinity of the windshield 23 to store the projection device 30 forming the head-up display device 11. The storage unit 26 has an opening 27 provided in an upper surface 28 of the instrument panel 25.

The projection device 30 projects an image for reflecting and displaying a display image on the display portion 24 of the windshield 23. The projection device 30 includes a housing 32 including an upper opening portion 31 formed therein. The housing 32 stores a projector 37, which includes a liquid crystal unit 33, a light diffusion unit 34, and a backlight unit 35, a plane mirror 38, and a concave mirror 39. Further, the housing 32 is attached with a covering member 40 for covering the upper opening portion 31.

The liquid crystal unit 33 stores a liquid crystal panel such as a TFT (Thin Film Transistor) (illustration thereof is omitted), and displays an image on the liquid crystal panel based on a control instruction from a display control unit 51 of the control device 12 described later. The light diffusion unit 34 includes a concave lens (illustration thereof is omitted) and a diffusion plate (illustration thereof is omitted) for diffusing the light of the backlight unit 35. The light diffused by the light diffusion unit 34 is supplied to the back surface of the liquid crystal panel of the liquid crystal unit 33. The backlight unit 35, which includes a light source, e.g., a plurality of LEDs (Light-Emitting Diodes), for illuminating a liquid crystal panel from the back side thereof, is connected to a lower portion of the light diffusion unit 34, and is driven based on a control instruction from the display control unit 51 described later.

The plane mirror 38 reflects the light emitted from the backlight unit 35 and transmitted through the liquid crystal panel of the liquid crystal unit 33, i.e., the image displayed on the liquid crystal panel, toward the concave mirror 39. The concave mirror 39 receives the light of the image reflected by the plane mirror 38, and further reflects the light toward the display portion 24 of the windshield 23. Further, the concave mirror 39 has a predetermined concave shape, and thereby corrects a distortion of the image caused when the image is reflected on the display portion 24 of the windshield 23 arranged in an inclined manner.

The covering member 40 is formed to have, for example, a flat plate shape or a substantially circular arc-shaped cross section slightly bent along the longitudinal direction of the vehicle. Further, the covering member 40 is formed by, for example, a transparent resin or glass capable of transmitting therethrough the light of the image reflected by the concave mirror 39. In a state in which the projection device 30 is stored in the storage unit 26, the covering member 40 faces the vehicle interior side of the windshield 23 through the opening 27 of the storage unit 26.

That is, according to the projection device 30, the image displayed on the liquid crystal panel of the liquid crystal unit 33 illuminated from, for example, the back side thereof by the light of the backlight unit 35 is projected by the projector 37, reflected by the plane mirror 38 and the concave mirror 39, transmitted through the transparent covering member 40, and thereafter projected on the display portion 24. Further, the image is reflected by the display portion 24 and reaches the viewpoint area of the driver as a display image.

Further, the concave mirror 39 has a reflecting surface 39A, the angle of which with respect to the plane mirror 38 or the display portion 24 of the windshield 23 is variable. The concave mirror 39 is pivotally supported to be rotatable around a rotary shaft 42a of a concave mirror-side gear 42 integrally provided thereto. A rotary shaft 43a of a drive gear 43 meshing with the concave mirror-side gear 42 is connected to a rotary shaft of a motor 44, such as a stepping motor. The motor 44 is driven to rotate based on a control instruction from a rotation control unit 55 of the control device 12 described later. As the motor 44 is driven to rotate, the drive gear 43 rotates around the rotary shaft 43a. Thereby, the concave mirror-side gear 42 rotates, and the angle of the reflecting surface 39A of the concave mirror 39 with respect to the plane mirror 38 or the display portion 24 of the windshield 23 is changed. A predetermined close position is set for the angle of the reflecting surface 39A of the concave mirror 39 to prevent external light (e.g., sunlight) from being sequentially reflected by the concave mirror 39 and the plane mirror 38 and incident on the liquid crystal unit 33.

The control device 12 is configured to include, for example, a display control unit 51, a manual operation unit 52, an automatic operation unit 53, a memory unit 54, and a rotation control unit 55.

The display control unit 51 controls the respective operations of the liquid crystal unit 33 and the backlight unit 35. If the display start and stop switch 13 outputs a control signal instructing to start the display, or if the ignition switch 15 outputs a control signal instructing to start the vehicle, for example, the display control unit 51 outputs a control signal instructing to start the illumination by the backlight unit 35 and the display by the liquid crystal unit 33. Further, if the display start and stop switch 13 outputs a control signal instructing to stop the display, or if the ignition switch 15 outputs a control signal instructing to stop the vehicle, for example, the display control unit 51 outputs a control signal instructing to stop the illumination by the backlight unit 35 and the display by the liquid crystal unit 33.

The manual operation unit 52 outputs a control signal instructing to drive the motor 44 to rotate, if the position adjustment switch 14 outputs a control signal instructing to change the rotation position of the concave mirror 39 (i.e., the angle of the reflecting surface 39A of the concave mirror 39 with respect to the plane mirror 38 or the display portion 24 of the windshield 23). The position adjustment switch 14 is capable of, for example, instructing to turn on or off the change in rotation position of the concave mirror 39 for each of one and the other of two rotation directions. During a period in which the position adjustment switch 14 continues to output a control signal indicating ON of the change in rotation position of the concave mirror 39, the manual operation unit 52 instructs to drive the motor 44 to rotate at a preset predetermined rotational speed in one or the other rotation direction (i.e., forward or reverse rotation) instructed by the position adjustment switch 14. Further, at every stop of the rotation of the concave mirror 39 according to the control signal output from the position adjustment switch 14, the manual operation unit 52 sequentially updates and stores in the memory unit 54 the final rotation direction, i.e., the rotation direction immediately before the stop of the rotation, as the final manual rotation direction.

As illustrated in FIGS. 2A and 2B, for example, if the display start and stop switch 13 outputs a control signal instructing to stop the display, or if the ignition switch 15 outputs a control signal instructing to stop the vehicle, the automatic operation unit 53 outputs a control signal instructing to drive the motor 44 to rotate such that a closing operation is performed to rotate the concave mirror 39 in a predetermined closing direction to a predetermined close position. In this case, the automatic operation unit 53 sequentially updates and stores in the memory unit 54 the number of steps (or the angle of rotation) of the motor 44 required for rotating the concave mirror 39 to the predetermined close position from the stop position at this time (i.e., final rotation stop position) as the step number Sa according to the final rotation stop position.

Further, as illustrated in FIGS. 2C and 2D, for example, if the display start and stop switch 13 outputs a control signal instructing to start the display, or if the ignition switch 15 outputs a control signal instructing to start the vehicle, the automatic operation unit 53 outputs a control signal instructing to drive the motor 44 to rotate such that an opening operation is performed to rotate the concave mirror 39 in a predetermined opening direction from a predetermined close position. In this case, if the predetermined opening direction of the concave mirror 39 matches the final manual rotation direction stored in the memory unit 54, the automatic operation unit 53 drives the motor 44 to rotate by the step number Sa according to the final rotation stop position stored in the memory unit 54 only in the rotation direction according to the predetermined opening direction of the concave mirror 39. Meanwhile, if the predetermined opening direction of the concave mirror 39 does not match the final manual rotation direction stored in the memory unit 54, the automatic operation unit 53 drives the motor 44 to rotate by the step number Sa according to the final rotation stop position stored in the memory unit 54 added with a predetermined extra step number Sb only in the rotation direction according to the predetermined opening direction of the concave mirror 39. Thereafter, the automatic operation unit 53 reverses the rotation direction of the motor 44, and drives the motor 44 to rotate by the predetermined extra step number Sb in the rotation direction according to a predetermined closing direction of the concave mirror 39.

The rotation control unit 55 drives the motor 44 to rotate by controlling the power transmission to the motor 44 in accordance with the control signal output from the manual operation unit 52 or the automatic operation unit 53.

The on-vehicle display apparatus 10 according to the present embodiment includes the above-described configuration. Subsequently, an operation of the on-vehicle display apparatus 10 will be described with reference to the accompanying drawings.

At Step S01 illustrated in FIG. 3, for example, determination is first made on whether or not the ignition switch 15 has been turned on to instruct to start the vehicle or the display start and stop switch 13 has output a control signal instructing to start the display. If the result of the determination is "NO," the procedure proceeds to END. Meanwhile, if the result of the determination is "YES," the procedure proceeds to Step S02.

Then, at Step S02, an opening operation is started which rotates the concave mirror 39 in a predetermined opening direction from a predetermined close position. Then, at Step S03, determination is made on whether or not the predetermined opening direction of the concave mirror 39 matches the final manual rotation direction stored in the memory unit 54. If the result of the determination is "NO," the procedure proceeds to Step S05 described later. Meanwhile, if the result of the determination is "YES," the procedure proceeds to Step S04.

Then, at Step S04, the motor 44 is driven to rotate by the step number Sa according to the final rotation stop position stored in the memory unit 54 only in the rotation direction according to the predetermined opening direction of the concave mirror 39. Meanwhile, at Step S05, the motor 44 is driven to rotate by the step number Sa according to the final rotation stop position stored in the memory unit 54 added with a predetermined extra step number Sb only in the rotation direction according to the predetermined opening direction of the concave mirror 39. Then, at Step S06, the motor 44 is driven to rotate by the predetermined extra step number Sb in the rotation direction according to a predetermined closing direction of the concave mirror 39. Then, at Step S07, the illumination by the backlight unit 35 and the display by the liquid crystal unit 33 are started.

Then, at Step S08, determination is made on whether or not the position adjustment switch 14 has output a control signal instructing to change the rotation position of the concave mirror 39 and the motor 44 has been driven to rotate in accordance with the instruction by the manual operation unit 52 to drive the motor 44 to rotate. If the result of the determination is "NO," the procedure proceeds to Step S10 described later. Meanwhile, if the result of the determination is "YES," the procedure proceeds to Step S09. Then, at Step S09, the final rotation direction of the concave mirror 39 according to the rotational drive of the motor 44, i.e., the rotation direction immediately before the stop of the rotation (final manual rotation direction) is sequentially updated and stored in the memory unit 54.

Then, at Step S10, determination is made on whether or not the ignition switch 15 has been turned off to instruct to stop the vehicle or the display start and stop switch 13 has output a control signal instructing to stop the display. If the result of the determination is "NO," the procedure returns to Step S08 described above. Meanwhile, if the result of the determination is "YES," the procedure proceeds to Step S11. Then, at Step S11, the illumination by the backlight unit 35 and the display by the liquid crystal unit 33 are stopped.

Then, at Step S12, a closing operation is started which rotates the concave mirror 39 in a predetermined closing direction from the stop position at this time (i.e., final rotation stop position) to a predetermined stop position. Then, at Step S13, the number of steps of the motor 44 required to rotate the concave mirror 39 from the stop position at this time (i.e., final rotation stop position) to the predetermined stop position is sequentially updated and stored in the memory unit 54 as the step number Sa according to the final rotation stop position. Then, the procedure proceeds to END.

According to the above-described operation, if the final rotation stop position of the concave mirror 39 is set or changed by the manual operation unit 52 in the execution of the display operation of the on-vehicle display apparatus 10, the final manual rotation direction is stored in association with the final rotation stop position. Further, the automatic operation unit 53 closes the concave mirror 39 from the final rotation stop position to the close position in the display stopping operation or the like, and returns the concave mirror 39 from the close position to the final rotation stop position in the display starting operation or the like. Particularly, in the returning operation, the automatic operation unit 53 causes the concave mirror 39 to rotate in the same rotation direction as the final manual rotation direction according to the manual operation unit 52, and thereafter causes the concave mirror 39 to stop at the final rotation stop position.

As described above, the on-vehicle display apparatus 10 according to the present embodiment stores the rotation direction of the concave mirror 39 rotated and stopped at the final rotation position (final rotation stop position) by the manual operation unit 52 (i.e., final manual rotation direction corresponding to rotation direction immediately before final stop), and matches the stored rotation direction with the rotation direction of the concave mirror 30 rotated and stopped at the final rotation stop position by the automatic operation unit 53 (i.e., rotation direction immediately before final stop). Thereby, it is possible to appropriately prevent the concave mirror 39 rotated by the automatic operation unit 53 from positionally deviating from the final rotation stop position in the rotation stopping operation, with no need for a special mechanism for reducing the clearance between mechanical movable parts, such as the concave mirror-side gear 42 and the drive gear 43 for rotating the concave mirror 39, and the backlash between the gears 42 and 43 (e.g., a spring member for biasing the concave mirror 39 in one of the rotation directions). Further, it is possible to prevent an increase in the costs required for the configuration of the device, and to prevent a reduction in the suitability for being mounted on a vehicle and the degree of design layout freedom.

In the above-described embodiment, the manual operation unit 52 and the automatic operation unit 53 rotate the concave mirror 39. However, the configuration is not limited thereto. For example, if the image is projected on a combiner openable and closable in accordance with the rotation thereof around a support shaft, in place of the display portion 24 of the windshield 23, the rotation of the combiner may be operated by the manual operation unit 52 and the automatic operation unit 53.

In the above-described embodiment, the concave mirror-side gear 42 and the drive gear 43 mesh with each other. However, the configuration is not limited thereto, and the concave mirror-side gear 42 and the drive gear 43 may be non-contact magnetic gears (electromagnetic gears). In this case, no backlash is generated between the concave mirror-side gear 42 and the drive gear 43. However, if the rotation direction of the concave mirror 39 immediately before the stop thereof when being rotated to and stopped at the final rotation stop position by the automatic operation unit 53 is matched with the final manual rotation direction stored in the memory unit 54, it is possible to eliminate the positional deviation of the concaved mirror 39 attributed to the delay of the concave mirror-side gear 42 in following the drive gear 43.

In the above-described embodiment, the manual operation unit 52 and the automatic operation unit 53 rotate the concave mirror 39. However, the configuration is not limited thereto. For example, if the image is projected on an openable and closable combiner, in place of the display portion 24 of the windshield 23, the combiner may be rotated by the manual operation unit 52 and the automatic operation unit 53.

In the above-described embodiment, the manual operation unit 52 and the automatic operation unit 53 control the rotational drive of the motor 44 based on the number of steps. However, the configuration is not limited thereto, and the operation units may perform the control based on, for example, the angle of rotation instead of the number of steps.

According to the embodiment of the present invention, the on-vehicle display apparatus stores the rotation direction of the reflection unit rotated and stopped at the rotation position by the manual operation unit (i.e., rotation direction immediately before final stop), and matches the stored rotation direction with the rotation direction of the reflection unit rotated and stopped at the rotation position by the automatic operation unit (i.e., rotation direction immediately before final stop). Thereby, it is possible to appropriately prevent the reflection unit rotated by the automatic operation unit from having positional deviation in the rotation stopping operation, with no need for a special mechanism for reducing the clearance between mechanical movable parts, such as gears included in the rotation unit that rotates the reflection unit, and the backlash between the gears (e.g., a spring member for biasing the reflection member in one of the rotation directions). Further, it is possible to prevent an increase in the costs required for the configuration of the device, and to prevent a reduction in the suitability for being mounted on a vehicle and the degree of design layout freedom.

Obviously, numerous modifications and variations of the present invention are possible in light of the above teachings. It is therefore to be understood that within the scope of the appended claims, the invention may be practiced otherwise than as specifically described herein.

What is claimed is:

1. An on-vehicle display apparatus comprising:
   a display to display an image;
   a reflector rotatably supported and capable of reflecting the image displayed in the display toward a driver seating on a driver's seat in a vehicle;
   a rotation device to rotate the reflector in a first rotation direction and a second rotation direction opposite to the first rotation direction;
   a manual operation device capable of manually operating the rotation device;
   an automatic operation device capable of automatically operating the rotation device;
   a controller configured to control the rotation device based on an input from the manual operation device or the automatic operation device; and
   a memory to store a rotation position of the reflector,
   wherein the manual operation device is capable of, during manual operation thereof, causing the rotation device to operate the reflector in the first rotation direction and the second rotation direction,
   wherein the memory stores, in association with the stored rotation position, a manual rotation direction of the reflector used to rotate to the stored rotation position immediately prior to storage of the stored rotation position based on the input from the manual operation device,
   wherein, when the controller causes, based on an input from the automatic operation device, the rotation device to rotate the reflector and to stop the reflector at the stored rotation position, the controller causes the rotation device to rotate the reflector in the stored manual rotation direction,
   wherein, if the first rotation direction input from the automatic operation device matches the stored manual rotation direction, the controller controls the rotation device to rotate the reflector in the first rotation direction and to stop the reflector when the reflector reaches the stored rotation position, and
   wherein, if the first rotation direction input from the automatic operation device does not match the stored manual rotation direction, the controller controls the rotation device to rotate in the first rotation direction until the reflector passes through the stored rotation position, and then controls the rotation device to rotate the reflector in the second rotation direction and to stop the reflector when the reflector reaches the stored rotation position.

2. The on-vehicle display apparatus according to claim 1, wherein the automatic operation device is configured to control the rotation device to operate the reflector in the first rotation direction and the second rotation direction during automatic operation.

3. The on-vehicle display apparatus according to claim 2, wherein the controller is configured to control, based on an input from the automatic operation device, the rotation device to rotate the reflector from a predetermined position to the stored rotation position or from the stored rotation position to the predetermined position.

4. The on-vehicle display apparatus according to claim 3, wherein the controller is configured to control, based on an input from the automatic operation device, the rotation device to rotate the reflector in the first rotation direction from the predetermined position first, wherein, if the first rotation direction matches the stored manual rotation direction, the controller is configured to control the rotation device to rotate the reflector in the stored manual rotation direction during automatic operation of the automatic operation device, and wherein, if the first rotation direction does not match the stored manual rotation direction, the controller is configured to control the rotation device to rotate the reflector in the stored manual rotation direction after the controller causes the rotation device to rotate the reflector in the first rotation direction from the predetermined position during automatic operation of the automatic operation device.

5. An on-vehicle display apparatus comprising:

a display configured to display an image;

a reflector rotatably supported and configured to reflect the image displayed in the display toward a driver seating on a driver's seat in a vehicle;

a rotation device configured to rotate the reflector in a first rotation direction and a second rotation direction opposite to the first rotation direction;

a manual operation device capable of manually operating the rotation device;

an automatic operation device capable of automatically operating the rotation device;

a controller configured to control the rotation device based on an input from the manual operation device and the automatic operation device; and a memory configured to store a rotation position of the reflector and an associated manual rotation direction of the reflector used to rotate the reflector to the stored rotation position immediately prior to storage of the stored rotation position based on input from the manual operation device, wherein the controller is configured to cause, based on input from the automatic operation device, the rotation device to rotate the reflector from a first position to the stored rotation position by using the stored associated manual rotation direction to reach and stop at the stored rotation position, wherein, if the first rotation direction input from the automatic operation device matches the stored associated manual rotation direction, the controller controls the rotation device to rotate the reflector in the first rotation direction and to stop the reflector when the reflector reaches the stored rotation position, and wherein, if the first rotation direction input from the automatic operation device does not match the stored associated manual rotation direction, the controller controls the rotation device to rotate in the first rotation direction until the reflector passes through the stored rotation position, and then controls the rotation device to rotate the reflector in the second rotation direction and to stop the reflector when the reflector reaches the stored rotation position.

* * * * *